(12) United States Patent
Weinhold

(10) Patent No.: US 8,991,873 B2
(45) Date of Patent: Mar. 31, 2015

(54) DEVICE FOR CONNECTING PIPELINES SUBJECTED TO CHANGES IN AXIAL LENGTH

(76) Inventor: Karl Weinhold, Neuss (DE)

( * ) Notice: Subject to any disclaimer, the term of this patent is extended or adjusted under 35 U.S.C. 154(b) by 912 days.

(21) Appl. No.: 13/001,711

(22) PCT Filed: Jun. 5, 2009

(86) PCT No.: PCT/EP2009/056966
§ 371 (c)(1),
(2), (4) Date: Mar. 23, 2011

(87) PCT Pub. No.: WO2010/000563
PCT Pub. Date: Jan. 7, 2010

(65) Prior Publication Data
US 2011/0198844 A1    Aug. 18, 2011

(30) Foreign Application Priority Data
Jul. 1, 2008   (DE) .......................... 10 2008 002 926

(51) Int. Cl.
| | | |
|---|---|---|
| F16L 27/087 | (2006.01) | |
| F16L 27/12 | (2006.01) | |
| F16L 51/00 | (2006.01) | |
| F16L 23/04 | (2006.01) | |

(52) U.S. Cl.
CPC ................. F16L 27/12 (2013.01); F16L 51/00 (2013.01); F16L 23/04 (2013.01)
USPC ..................... 285/145.1; 285/145.4; 285/101; 285/302

(58) Field of Classification Search
CPC .... F16L 27/08166; F16L 27/087; F16L 27/12
USPC ............ 285/145.1, 298, 302, 101, 145.4, 32, 285/102, 103
See application file for complete search history.

(56) References Cited

U.S. PATENT DOCUMENTS

| | | | | |
|---|---|---|---|---|
| 915,502 | A | * | 3/1909 | Struer ........................... 285/302 |
| 1,095,926 | A | * | 5/1914 | Powell ............................. 92/53 |
| 1,334,007 | A | * | 3/1920 | White ............................ 277/621 |
| 1,363,974 | A | * | 12/1920 | Heylman ...................... 285/302 |
| 1,947,072 | A | * | 2/1934 | Walton et al. ................. 277/619 |
| 3,291,442 | A | * | 12/1966 | Cranage .................... 251/149.1 |

(Continued)

FOREIGN PATENT DOCUMENTS

| | | |
|---|---|---|
| DE | 3609150 C1 | 8/1987 |
| DE | 3835690 A1 | 4/1990 |

(Continued)

Primary Examiner — James Hewitt
(74) Attorney, Agent, or Firm — The Webb Law Firm

(57) ABSTRACT

A device for connecting pipelines subjected to axial length changes, comprising a pipe element with a flange having an end-face annular surface and a ring encompassing the pipe element, a sliding sleeve, the internal diameter of which corresponds to the external diameter of the flange and one end of which has an opening for receiving the pipe element, the flange being arranged such that it can move axially in the sliding sleeve, and by an outer bushing which is attached to the sliding sleeve and is arranged around the pipe element and the ring and the internal diameter of which corresponds to the external diameter of the ring and the interior of which is connected to the interior of the line by at least one opening in the pipe element and in which the ring forms a pressurized annular surface which is substantially the same size as the annular surface.

18 Claims, 3 Drawing Sheets

(56) References Cited

U.S. PATENT DOCUMENTS 4,807,262 A * 2/1989 Shields ............... 376/203
6,752,434 B2 * 6/2004 Cummins ............ 285/124.1

FOREIGN PATENT DOCUMENTS

DE 29705729 U1 7/1997
DE 102005019644 A1 11/2006

* cited by examiner

DEVICE FOR CONNECTING PIPELINES SUBJECTED TO CHANGES IN AXIAL LENGTH

BACKGROUND OF THE INVENTION

1. Field of the Invention

The invention relates to a device for connecting pipelines, in particular high pressure pipelines, which are subjected to changes in axial length and are laid in mine shafts, for example.

2. Description of Related Art

Lines of this type are also called "shaft lines". Shaft lines are not only used in hard coal mining in Germany, but also in hard coal mining in foreign countries; these pipelines have to convey fluids over many hundred meters to the respective underground mining operation. In this respect, there is often a problem regarding the linear extension of such installed shaft lines. Such a linear extension can be compensated by the use of hoses which are installed approximately every 100 m, or by the use of known expansion spirals which can compensate for a linear extension of from 40 to 50 mm per hundred meters.

If shaft lines with relatively large diameters and high pressures are used, the extension problem becomes even more complicated, since with thick-walled pipes, small spiral diameters cannot be bent and there are no hoses for pressure ranges of more than 400 bars to enable a flexible element to be laid in the shaft line.

Therefore, the object of the invention is to provide a device for connecting pipelines which are subjected to changes in axial length, which device can also be used for very high pressures, has a simple construction and nevertheless can be dismantled for maintenance and cleaning purposes.

SUMMARY OF THE INVENTION

This object is achieved with a device including a pipe element with a flange having an end-face annular surface, as well as a ring which encompasses the pipe element, a sliding sleeve, the internal diameter of which corresponds to the external diameter of the flange and one end of which has an opening for receiving the pipe element, the flange being arranged such that it can move axially in the sliding sleeve, and by an outer bushing which is attached to the sliding sleeve and is arranged around the pipe element and the ring and the internal diameter of which corresponds to the outer diameter of the ring and the interior of which is connected to the interior of the line via at least one opening in the pipe element, and in which the ring forms a pressurised annular surface which is substantially the same size as the annular surface.

The invention recognises that it is possible to provide each of the end-face annular surfaces constantly exposed to the pressure inside the pipe in telescopic connections with a corresponding compensating element which, in turn, has a pressurised end-face annular surface, but in the opposite direction. In this manner, the individual devices behave in a neutral manner such that an addition of individual relatively small pressure loads in a specific direction is reliably ruled out.

Due to the considerable depths, particularly in hard coal mining, shaft lines often have lengths of much more than 1,000 meters, so that changes in length without corresponding compensating elements would result in a linear extension of the line which would deform the line in an undulating manner, thereby possibly resulting in kinks which could even pull out holding means from the shaft wall.

In a further configuration of the invention, the outer bushing is screwed together with the sliding sleeve and/or the ring is screwed together with the pipe element. It is understood that corresponding sealing elements are present at the end of the screw connections. The screw connection has the advantage of a defined position, since the two parts to be joined together can be brought into the desired position (as an end position) when the device is assembled.

A further teaching of the invention relates to a device which can be inserted between two line ends having pipe couplings and which thus has corresponding coupling elements on the end faces. A connection with pipe couplings and clamps is advantageous so that the individual elements can be easily assembled and disassembled, for example in order to replace sealing rings. For this purpose, the pipe element has a pipe coupling element on its end opposite the flange.

To provide the pipe element with a particularly good hold, in a further configuration of the invention the pipe coupling element has a relatively long pipe coupling flange into which the end of the pipe element is screwed. Just like the outer bushing and/or the ring, this pipe coupling flange can have blind holes arranged distributed uniformly over the outer periphery to facilitate screwing and in particular unscrewing operations for maintenance purposes.

In a further configuration of the invention, the sliding sleeve has at its open end an adapter element, the internal diameter of which corresponds to that of the pipeline and the adapter element projects inside the sliding sleeve. Preferably, both the adapter element and the sliding sleeve can each have a flange so that the adapter element can be connected together with the sliding sleeve by a pipe coupling clamp or screw pipe coupling.

If the device according to the invention is to be used in a pipeline with line ends having pipe couplings, then the adapter element preferably also has on its end opposite the sliding sleeve a pipe coupling element which can likewise be configured as a pipe coupling clamp or as a screw pipe coupling.

According to a further teaching of the invention, so that the part of the outer bushing which is not subjected to the medium in the line remains pressure-free, the outer bushing has a plurality of openings which are arranged distributed over its periphery and through which the air can escape when the length of the pipe element is changed. The openings are expediently configured as holes.

It is understood that between respectively two parts which engage one inside the other, in each case at least one seal is arranged in corresponding grooves, with O-rings preferably being used as seals.

In a further configuration of the invention, the grooves provided for the sealing rings have a suitable surface tempering.

Finally, in the device according to the invention, all the close sliding fits and surfaces are preferably provided with a grime-repelling coating. A coating of this type is very important since, in this manner, the formation of so-called tutty which occurs through galvanisation of the pipes, can be reliably avoided.

BRIEF DESCRIPTION OF THE DRAWINGS

In the following, the invention is described in more detail with reference to drawings which show only one preferred exemplary embodiment. In the drawings.

DESCRIPTION OF THE PREFERRED EMBODIMENTS

Figure 1:
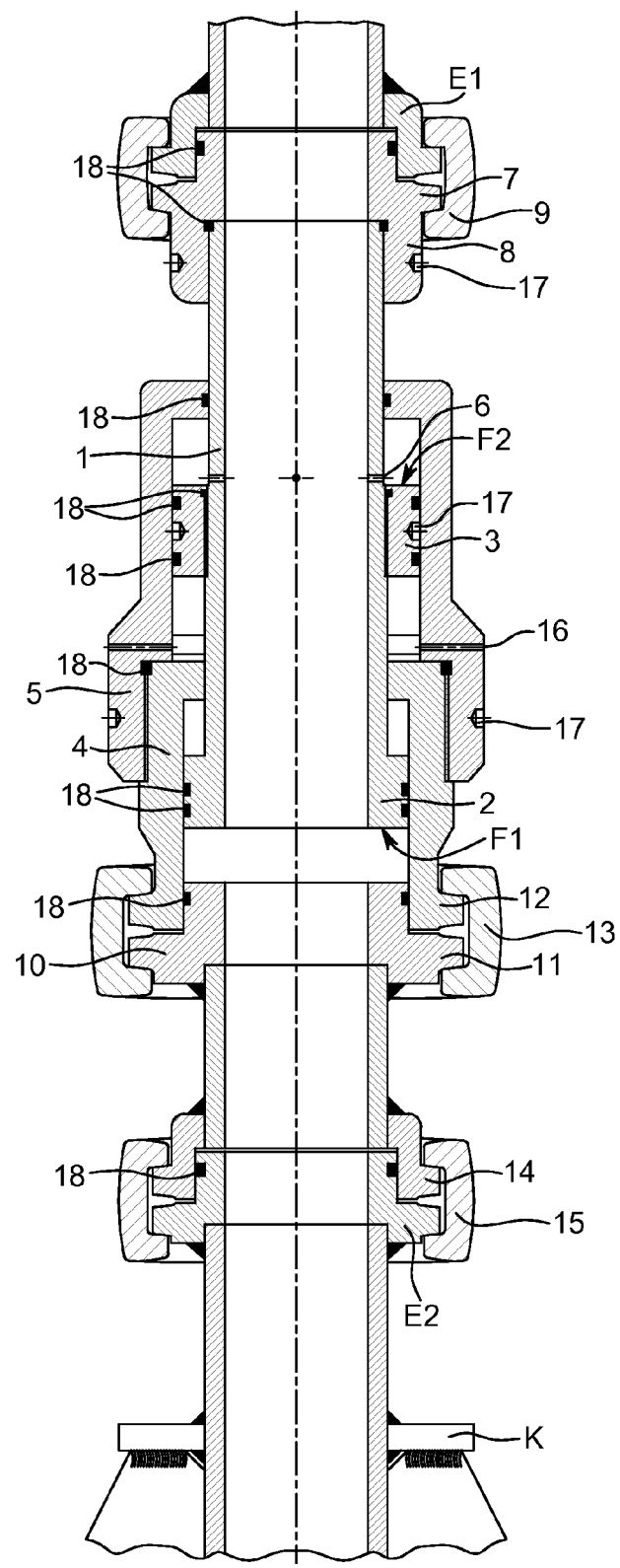
FIG. 1 shows a longitudinal sectional view through a device according to the invention in the central position.
Figure 2:
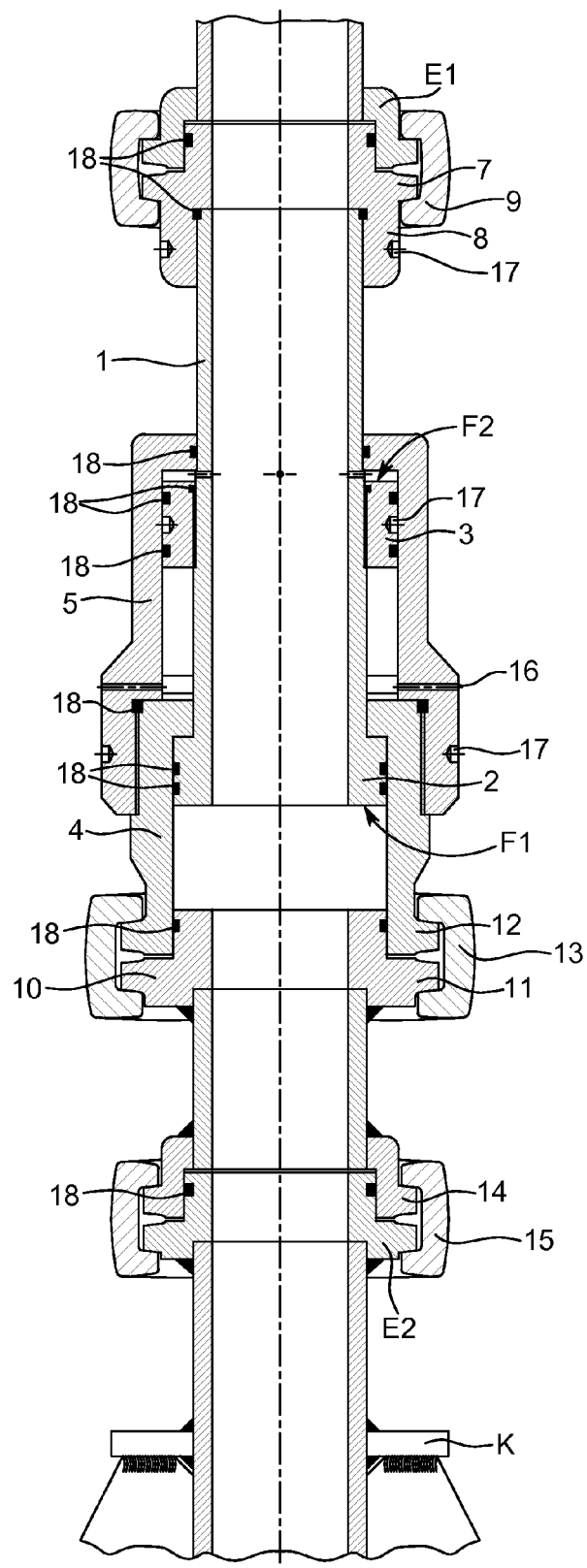
FIG. 2 shows the subject matter of FIG. 1 in its first end position.
Figure 3:
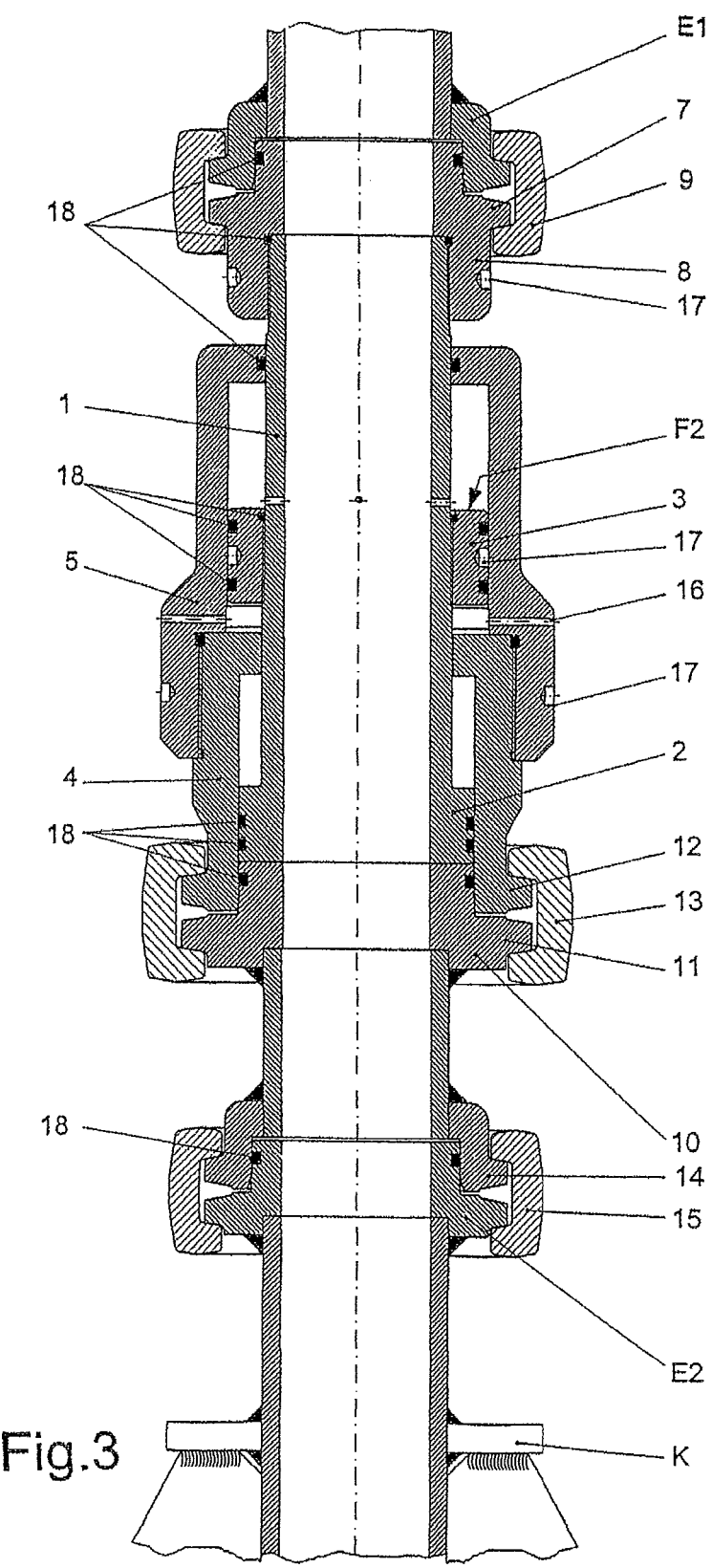
FIG. 3 shows the subject matter of FIG. 1 in its second end position.

The figures show the same subject matter, namely the device according to the invention in a central position (FIG. 1), in an extended end position (FIG. 2) and in a retracted end position (FIG. 3).

The device firstly consists of a first pipe element 1, one end of which is reinforced by a flange 2 and around the circumference of which a ring 3 is arranged approximately in the centre. In the illustrated exemplary embodiment, preferred in this respect, the ring 3 is screwed onto the pipe element 1; for this purpose the pipe element 1 provides in the desired location a corresponding external thread (not shown in more detail). Accordingly, the ring 3 has a corresponding internal thread.

The pipe element 1 is then arranged with its end having the flange 2 in a sliding sleeve 4 which, in turn, is connected to an outer bushing 5, the internal diameter of which corresponds to the outer diameter of the ring 3 and the end of which remote from the sliding sleeve 4 has an opening for receiving the pipe element 1. The annular space formed between ring 3 and upper end of the outer bushing 5 is connected to the fluid in the pipeline via holes 6 which are arranged distributed uniformly over the circumference of the pipe element 1.

Since on the one hand the end-face annular surface of the flange 2 has a first surface $F_1$ inside the sliding sleeve 4, the shape of the ring 3 and outer bushing 5 is selected such that the pressurised annular surface of the ring 3, denoted as surface $F_2$, should be substantially exactly the same size as the annular surface $F_1$ in order to allow a pressure compensation in the axial direction for any desired position of pipe element 1 relative to sliding sleeve 4. This measure can reliably prevent a build-up of axial pressure added on one side.

In the illustrated exemplary embodiment, preferred in this respect, the ends of the shaft lines which are denoted above by $E_1$ and below by $E_2$ have pipe coupling elements. Accordingly, screwed onto the upper end of the pipe element 1 is a pipe coupling element 7 which is configured as an insertion piece in the illustrated case and corresponds to the end, configured as a sleeve part, of the shaft line $E_1$. The pipe coupling element 7 has in this respect a relatively long pipe coupling flange 8 in which the screw connection is made with the end of the pipe element 1 by a thread (not described further). In the illustrated case, the two pipe coupling elements 7 and $E_1$ are held together by a clamp coupling 9.

Located under the sliding sleeve 4 is an adapter element 10, the internal diameter of which corresponds to that of the pipeline and which has at its end a diameter corresponding to the internal diameter of the sliding sleeve 4 and which projects inside said sliding sleeve 4. The adapter element 10 has a flange 11 on its upper end and the sliding sleeve 4 has a flange 12 on its lower end, which flanges 11 and 12 are connected together by a clamp 13. The lower end of the adapter element 10 is likewise provided with a pipe coupling element, in the illustrated exemplary embodiment with a sleeve 14 into which the end $E_2$, configured as an insertion piece, of the lower pipeline section is introduced, the two flanges of these parts being connected by a clamp 15.

So that the annular space below the ring 3 remains pressure-free in any case even during axial movements of the device, a plurality of holes 16 are provided which are arranged distributed over the periphery of the outer bushing 5, to ensure a corresponding air inlet and outlet.

To simplify assembly and disassembly, the flange, provided with an internal thread, of the outer bushing 5 and the pipe coupling flange 8, just like the ring 3 on its outside, have blind holes 17 which are arranged distributed over the periphery and in which suitable tools can engage to apply the necessary torque.

Finally, at least one seal is arranged universally between two parts engaging in one another, in appropriate grooves. These seals are advantageously configured as O-rings and the associated grooves are expediently surface tempered.

The shaft line itself can be suspended from a bracket K and then hang freely for approximately 100 m to then open into a next device for compensating the change in length which, attached to a stand pipe, in turn is coupled with a corresponding bracket. The length of 100 m serves here merely as an example; it can also be only 50 m or even less or perhaps also 110 m. The use of the device according to the invention also means that a shaft line no longer has to be attached to the wall by every pipe or every second pipe, since where there is axial pressure which is compensated accordingly, it is possible to prevent the line from kinking.

Instead of the illustrated pipe couplings with clamps, it is of course also possible to use other high pressure screw connections, for example high pressure screw connections according to German patent 10 2005 019 644 by the Applicant of this patent application. Theoretically, it is also possible to directly weld the device to the pipelines and to omit the pipe couplings. However, due to maintenance intervals, this does not seem to be appropriate, because the sealing rings 18 in particular contained in the device can be subject to wear by the high pressure of the transported fluid and must therefore be replaceable.

FIG. 2 shows the device according to the invention in the extended state; this corresponds to a shortened upper pipeline section. In this end position as well, the two annular surfaces $F_1$ and $F_2$ are pressurised by medium, so that the upper pipeline can be extended in a simple and pressure-free manner.

Finally, FIG. 3 shows the opposite end position, as must never occur in normal operation, since here the lower annular surface $F_1$ is in contact with the corresponding annular surface of the adapter element 10 and is thus no longer pressurised. Therefore, when devising the dimensions of the device according to the invention, a sufficient "reserve" must always be provided. Alternatively, it would also be possible to configure the upper annular surface of the adapter element 10 to be conical, so that the annular surface $F_1$ is pressurised in its end position as well.

The invention claimed is:

1. A device for connecting pipelines that are subjected to changes in axial length, the device comprising:
   a pipe element with a flange having an end-face annular surface and a ring encompassing the pipe element,
   a sliding sleeve, an internal diameter of which corresponds to an external diameter of the flange and one end of which has an opening for receiving the pipe element, the flange being arranged such that the flange can move axially in the sliding sleeve, and
   an outer bushing which is attached to the sliding sleeve and is arranged around the pipe element and the ring and an internal diameter of which corresponds to an external diameter of the ring and an interior of which is connected to an interior of a pipeline by at least one opening in the pipe element and in which the ring forms a pressurized annular surface which is substantially the same size as the end-face annular surface.

2. The device according to claim 1, wherein the at least one opening in the pipe element is a plurality of openings comprising holes arranged and distributed over a circumference of the pipe element.

3. The device according to claim 1, wherein the outer bushing is screwed together with the sliding sleeve.

4. The device according to claim 3, wherein the outer bushing, the ring or the pipe coupling flange has blind holes arranged distributed uniformly over an outer periphery to simplify the screwing and unscrewing operations.

5. The device according to claim 1, wherein the ring is screwed together with the pipe element.

6. The device according to claim 5, wherein the outer bushing, the ring or the pipe coupling flange has blind holes arranged distributed uniformly over an outer periphery to simplify the screwing and unscrewing operations.

7. The device according to claim 1, wherein the device can be inserted between ends of two pipelines having pipe coupling elements on end faces.

8. The device according to claim 7, wherein the pipe coupling element has an elongated pipe coupling flange and is coupled together with the pipe element.

9. The device according to claim 8, wherein the outer bushing, the ring or the pipe coupling flange has blind holes arranged distributed uniformly over an outer periphery to simplify the screwing and unscrewing operations.

10. The device according to claim 1, wherein the sliding sleeve has at an open end thereof an adapter element, an internal diameter of which corresponds to that of the pipeline, and wherein the adapter element projects inside the sliding sleeve.

11. The device according to claim 10, wherein the adapter element has a flange and the sliding sleeve has a flange, and wherein the adapter element and the sliding sleeve are connected together by a pipe coupling clamp.

12. The device according to claim 10, wherein the device can be inserted between two ends of the pipeline having pipe coupling elements on end faces.

13. The device according claim 1, wherein the outer bushing has a plurality of openings arranged and distributed over a periphery thereof so that an interior of the bushing remains pressure-free and air can escape when a length of the pipe element is changed.

14. The device according to claim 13, wherein the openings are configured as holes.

15. The device according to claim 1, comprising at least one seal arranged in a groove on at least one of the pipe element, the sliding sleeve, and the bushing for sealing the device.

16. The device according to claim 15, wherein the seals are configured as O-rings.

17. The device according to claim 15, wherein the grooves are surface tempered.

18. The device according to claim 1, further comprising a grime-repelling coating on at least one of the pipe element, the sliding sleeve, and the bushing.

* * * * *

UNITED STATES PATENT AND TRADEMARK OFFICE
CERTIFICATE OF CORRECTION

| | | |
|---|---|---|
| PATENT NO. | : 8,991,873 B2 | Page 1 of 1 |
| APPLICATION NO. | : 13/001711 | |
| DATED | : March 31, 2015 | |
| INVENTOR(S) | : Karl Weinhold | |

It is certified that error appears in the above-identified patent and that said Letters Patent is hereby corrected as shown below:

In the claims,

Column 5, Line 29, Claim 10, delete "has at" and insert -- has --

Column 6, Line 10, Claim 13, delete "according" and insert -- according to --

Signed and Sealed this
Twelfth Day of January, 2016

Michelle K. Lee
*Director of the United States Patent and Trademark Office*